Dec. 4, 1928.
T. H. THOMAS
1,693,626
SPLIT REDUCTION DEVICE
Filed Nov. 27, 1926
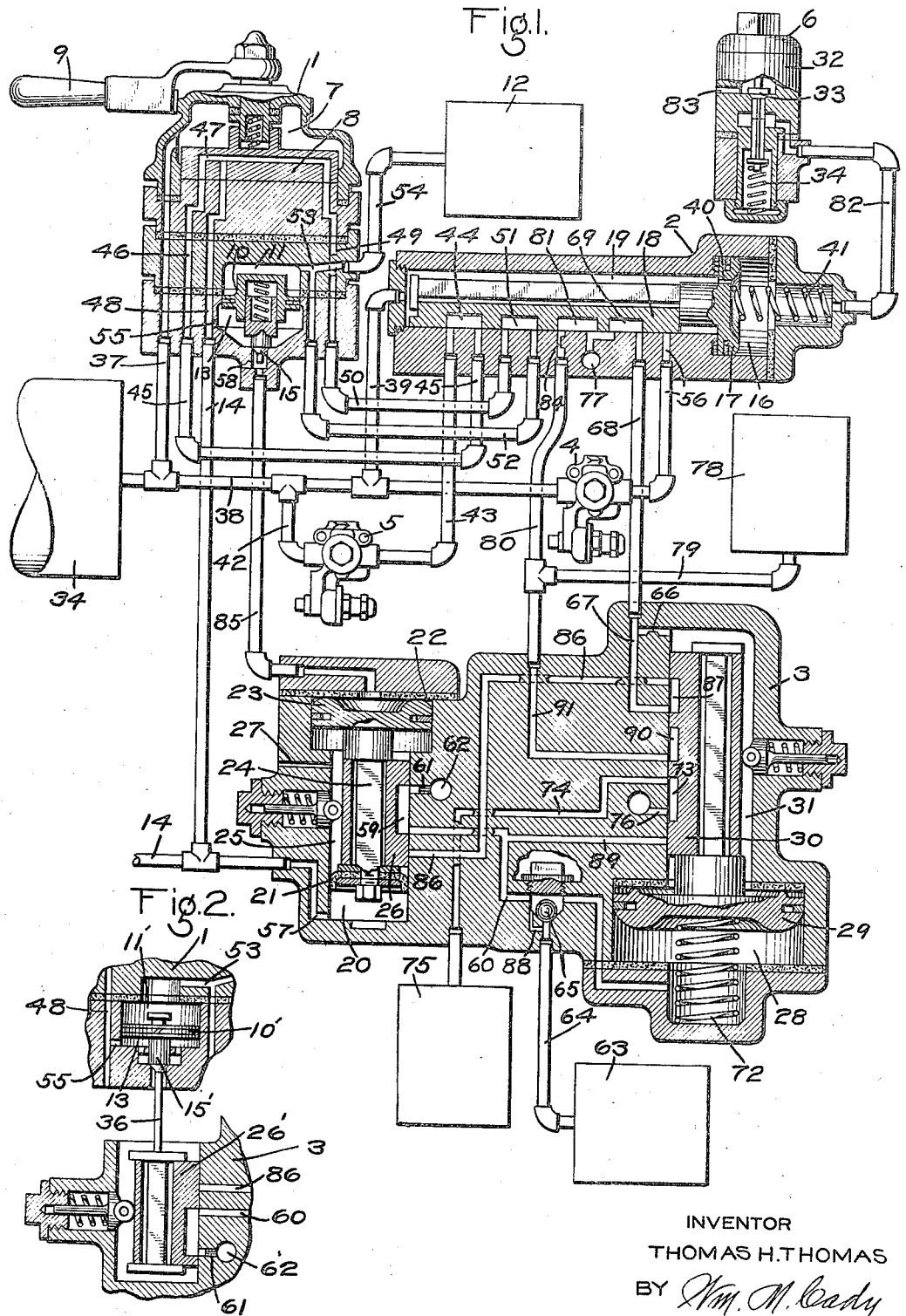
INVENTOR
THOMAS H. THOMAS
BY Wm. M. Cady
ATTORNEY

REISSUED

Patented Dec. 4, 1928.

1,693,626

UNITED STATES PATENT OFFICE.

THOMAS H. THOMAS, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

SPLIT REDUCTION DEVICE.

Application filed November 27, 1926. Serial No. 151,087.

This invention relates to fluid pressure brakes and more particularly to a device for effecting a reduction in brake pipe pressure in two stages.

In a prior application of Thomas H. Thomas and Earle S. Cook, Serial No. 109-044, filed May 14, 1926, means are disclosed for automatically effecting a reduction in brake pipe pressure in two stages, so that corresponding successive applications of the brakes are produced. This is accomplished by first automatically connecting the usual equalizing reservoir to a first reduction reservoir to effect an initial reduction in brake pipe pressure, and a corresponding application of the brakes, and then to a second reduction reservoir to effect a second reduction in brake pipe pressure and a further application of the brakes.

One object of my invention is to provide an improved split reduction device of the above character in which means are provided for ensuring that the second reduction reservoir will not be connected to the equalizing reservoir until the first reduction in brake pipe pressure has been completed.

Another object of my invention is to provide means for ensuring that the operating parts will be maintained in the second reduction position, so long as the second reduction is being effected.

Other objects and advantages will be apparent in the following more detailed description of my invention.

In the accompanying drawing; Fig. 1 is a diagrammatic sectional view of a fluid pressure brake equipment embodying my invention; and Fig. 2 a slightly modified form of one feature of my invention.

The brake equipment as shown in the drawing, may comprise a brake valve device 1, an application valve device 2, a split reduction valve device 3, two feed valve devices 4 and 5, and a magnet valve device 6.

The brake valve device 1 may comprise a casing, having a chamber 7, containing a rotary valve 8 adapted to be operated by a handle 9. Said casing may also contain an equalizing piston 10 forming a chamber 11, at one side, connected to the equalizing reservoir 12, and a chamber 13 at the opposite side connected to the usual brake pipe 14, said equalizing piston being adapted to operate a discharge valve 15.

The application valve device 2 may comprise a casing, having a piston chamber 16, containing a piston 17 adapted to operate a slide valve 18 contained in valve chamber 19.

The split reduction valve device 3 may comprise a casing, having a piston chamber 20 containing a piston 21, and a piston chamber 22 containing a piston 23, said pistons being connected together by a stem 24 and having differential areas. The valve chamber 25, intermediate the pistons 21 and 23, contains a slide valve 26 adapted to be operated by said differential pistons, and said chamber is constantly open to the atmosphere by way of passage 27. Said casing also has a piston chamber 28 containing a piston 29 adapted to operate a slide valve 30 contained in valve chamber 31.

The magnet valve device 6 may comprise a magnet 32 adapted to operate a valve 33 provided to control the venting of fluid under pressure from the piston chamber 16 of the application valve device 2. When the magnet 32 is energized, the valve 33 is seated, and when said magnet is deenergized, the pressure of spring 34 unseats valve 33.

When the train is running under a clear signal indication, the train control apparatus is effective to cause the magnet 32 to be energized. With said magnet energized, the valve 33 is held seated, so that piston chamber 16 is cut off from the atmospheric vent port 83.

Fluid is supplied from the main reservoir through pipe 37 to valve chamber 7 of the brake valve device 1, and also through pipes 38 and 39 to valve chamber 19 of the application valve device 2. Fluid under pressure in valve chamber 19 then equalizes through port 40 in the piston 17 and into piston chamber 16, thereby permitting the spring 41 to hold said piston and slide valve 18 in the release position, as shown in the drawing.

The feed valve device 5 is adapted to supply fluid at the reduced pressure carried in the brake pipe, and the brake pipe is charged with fluid at the reduced pressure through pipe 43, cavity 44 in slide valve 18 of the application valve device 2, pipe 45, passage 46 in the brake valve device 1, cavity 47 in the rotary valve 8 (with the brake valve device in running position) and passage 48 to the brake pipe 14. Cavity 47 is also connected to the passage 49, through which fluid at feed valve pressure is supplied to the equalizing reservoir 12 and piston chamber 11 of the equalizing piston 10 by way of a pipe 50, cavity 51 in slide valve 18 of the application valve device 2, pipe 52, passage 53, and pipe 54. Thus the equalizing reservoir 12 and chamber 11 are charged with fluid at brake pipe pressure. Chamber 13, at the opposite side of the equalizing piston 10, being connected to the brake pipe 14 through passage 55, the fluid pressures on opposite sides of the equalizing piston are equalized and the discharge valve 15 is therefore held seated.

The feed valve device 4 supplies fluid at the reduced pressure desired for operation of the split reduction valve device 3 to pipe and passage 56, which passage is lapped by the slide valve 18, of the application valve device 2 in its release position.

Piston chamber 20 of the split reduction valve device 3 is connected to the brake pipe 14 through passage 57, while piston chamber 22 is vented to the atmosphere through a choked port 58 in the brake valve device, so that with the brake valve in running position, the differential pistons 21 and 23 and slide valve 26 are held in the position shown in the drawing, in which position cavity 59 in said slide valve connects passage 60, from piston chamber 28, to the atmosphere through the choked passage 61 and the atmospheric exhaust port 62. The timing reservoir 63 is connected through pipe 64 and past the ball check valve 65 to passage 60, and consequently said reservoir is normally maintained at atmospheric pressure.

Valve chamber 31 is connected to the atmosphere through a choked passage 66, passage 67, pipe 68, cavity 69 in slide valve 18 of the application valve device 2, to atmospheric port 77. Atmospheric pressure being present in both the valve chambers 31 and piston chamber 28 of the split reduction valve device, the spring 72 holds the piston 29 and slide valve 30 in the position shown in the drawing, in which position cavity 73 in said slide valve connects passage 74 from the second reduction reservoir 75 to the atmospheric exhaust port 76. The first reduction reservoir 78 is connected to the atmosphere through pipes 79 and 80, cavity 81 in the slide valve 18 of the application valve device 2, to the atmospheric exhaust port 77.

If the traffic conditions are unfavorable, the train control apparatus operates to cause the deenergization of magnet 32, and the pressure of spring 34 then unseats the valve 33 so that fluid is vented from piston chamber 16 of the application valve device 2, through pipe 82 to passage 83 and the atmosphere. Fluid under pressure being thus vented from chamber 16, fluid at main reservoir pressure in valve chamber 19 causes the piston 17 to be shifted, against the pressure of spring 41, to the application position.

Piston 17, moving to application position, shifts the slide valve 18 to a position in which communication from pipe 43 to the brake pipe 14 is cut off, so that further supply of fluid from the feed valve device 5 to the brake pipe is prevented.

In the application position of the slide valve 18, cavity 51 connects pipe 52 from the equalizing reservoir 12 and chamber 11, at one side of the equalizing piston 10, to the choked passage 84 which leads to pipe 80 and the first reduction reservoir 78. Fluid under pressure in the equalizing reservoir 12 and the equalizing piston chamber 11 then equalizes into the first reduction reservoir 78, thereby permitting the higher brake pipe pressure in chamber 13 to shift the equalizing piston 10 so as to open the discharge valve 15.

When the discharge valve 15 opens, fluid under pressure from the brake pipe 14 discharges into pipe 85 at a greater rate than it can flow to the atmosphere through the choked passage 58, and thus the pressure is built up in pipe 85 and piston chamber 22.

The area of piston 23 being greater than the area of piston 21, when the fluid pressure in chamber 22 has been increased to a predetermined degree relative to the brake pipe pressure in chamber 20, the piston 23 is shifted and the slide valve 26 is moved to a position in which cavity 59 connects passages 60 and 86.

In application position, cavity 69 in slide valve 18 of the application valve device 2, connects pipes 56 and 68, so that fluid under pressure from the feed valve device 4 flows through pipe 68, passage 67, and a choked passage 66 into valve chamber 31 and also through cavity 87 in slide valve 30, passage 86, cavity 59 in slide valve 25, and passage 60 to piston chamber 28. The piston chamber 28 and valve chamber 31 thus become charged to the same pressure, so that spring 72 holds the piston 29 and slide valve 30 in the position shown in the drawing.

Fluid under pressure also flows from passage 60, through a choked passage 88 and pipe 64 to the timing reservoir 63, thus charging said reservoir.

When the brake pipe pressure has been reduced by flow through the exhaust port 58 to a degree slightly less than the pressure in the equalizing reservoir 12, as reduced by equalization into the first reduction reservoir 78, the equalizing piston 10 operates in the usual manner to close the discharge valve 15 and thus prevent any further reduction in brake pipe pressure.

The discharge valve 15 being closed, fluid under pressure in piston chamber 22 of the split reduction valve device continues to vent to atmosphere through the choked passage 58, so that the pressure in said chamber is reduced until the brake pipe pressure in piston chamber 20 acting on piston 21 is sufficient to shift the pistons 21 and 23 upwardly. Said pistons move the slide valve 26 so that cavity 59 connects passage 60 through the choked passage 61 to atmosphere through exhaust port 62. Piston chamber 28 and the timing reservoir 63 being connected to passage 60, fluid under pressure in piston chamber 28 and the timing reservoir 63 is vented to the atmosphere.

When the pressure in piston chamber 28 and the timing reservoir 63 is reduced to a predetermined degree, the pressure in valve chamber 31 shifts the piston against the pressure of spring 72. The slide valve 30 is thereby shifted to its outer position, in which cavity 73 connects passage 89 with passage 76, so that piston chamber 28 and the timing reservoir 63 are connected to the atmospheric exhaust port 76. Means are thus provided by which said piston and slide valve are maintained in their outer positions, even in case the differential pistons 21 and 23 should cause movement of the slide valve 26 such as to cut off the exhaust port 62 from piston chamber 28.

With the slide valve 30 in its outer position, cavity 90 connects passage 91 and pipes 79 and 80 with passage 74 and the second reduction reservoir 75. Fluid under pressure in the equalizing reservoir 12 and in the first reduction reservoir 78 then equalizes into the second reduction reservoir 75, so that the fluid pressure in the equalizing piston chamber 11 is correspondingly reduced, causing the higher brake pipe pressure in chamber 13 to operate said piston and again open the discharge valve 15, so as to effect a second reduction in brake pipe pressure and a consequent second application of the brakes.

The discharge of fluid from the brake pipe into pipe 85 and to piston chamber 22 causes the differential pistons 21 and 23 to be shifted, and thereby the slide valve 26, in the same manner as during the first reduction.

In making the second reduction in brake pipe pressure, however, the piston 29 and slide valve 30 are in the lower position, so that although the slide valve 26 is shifted to the lower position, in which passage 86 is connected to passage 60, the slide valve 30 being now in its lower position, cuts off communication from passage 86 to passage 67. Consequently the piston 29 is maintained in its lower position by reason of the connection of piston chamber 28 through passage 89 with exhaust port 76.

When the brake pipe pressure in chamber 13, at one side of the equalizing piston 10, has reduced to a degree slightly less than the reduced pressure in the equalizing reservoir and in chamber 11, the equalizing piston 10 again operates to close the discharge valve 15.

When the magnet 32 is again energized, valve 34 is shifted to its seat. Fluid under pressure from valve chamber 19 then equalizes through port 40 in piston 17 into piston chamber 16. The spring 41 then shifts the piston 17 and slide valve 18 to release position, in which the brake pipe 14 and equalizing reservoir 12 are recharged, causing a consequent release of the brakes. The first and second reduction reservoirs and the timing reservoir are also vented to the atmosphere, and in fact the parts are all restored to their normal release positions in the same manner as hereinbefore described in connection with the initial charging of the equipment.

Instead of controlling the operation of slide valve 26 by means of differential pistons adapted to be operated by fluid under pressure vented in the opening movement of the discharge valve 15, a corresponding slide valve 26′ may be mechanically connected to the discharge valve 15′ by a stem 36, as shown in Fig. 2. With this construction, when the discharge valve 15′ is moved to open position, the slide valve 26′ is also moved.

In normal release position, as shown in Fig. 2, passage 60 is connected to exhaust port 62, as in the case with the construction shown in Fig. 1. When the slide valve 26′ is moved with the discharge valve 15′, as said valve opens, passage 60 is connected to passage 86, so that the same connections are made, as in the Fig. 1 construction.

From the foregoing description of the construction and operation, it will be apparent that the first and second reduction reservoirs are normally disconnected and are not connected until after the timing reservoir pressure has reduced to a predetermined degree following the first reduction in brake pipe pressure, thus ensuring against the possible venting of fluid from the equalizing reservoir into the second reduction reservoir while the first reduction in brake pipe pressure is being effected.

It will also be noted that piston 29 and slide valve 30 are maintained in the second reduction position, independently of the possible movement of the differential pistons 21 and 23, and that piston 29 will not be moved back to its normal position until the application piston 17 is moved back to normal release position, in which valve chamber 31 is vented to the atmosphere through pipe 68, cavity 69 in slide valve 18 and exhaust port 71.

The feed valve device 4, in addition to the usual feed valve device 5, is provided for the reason that the same constant pressure, for example 60 pounds, is desired at all times for use in the split reduction valve device 3, while the usual feed valve device 5 may be adjusted to maintain different pressures in the brake pipe, according to the class of service in which the train may be operating.

Having now described my invention, what I claim as new and desire to secure by Letters Patent, is:

1. In a fluid pressure brake, the combination with a brake pipe, of two reduction reservoirs, means operated upon a venting of fluid under pressure into either reservoir for effecting a reduction in brake pipe pressure, one reservoir being connected for venting purposes only after the venting of fluid from the brake pipe due to venting of fluid under pressure to the other reservoir has ceased.

2. In a fluid pressure brake, the combination with a brake pipe, of a first reduction reservoir, a second reduction reservoir, and means for first venting fluid under pressure to the first reservoir to effect a reduction in brake pipe pressure and then to the second reduction reservoir to effect a second reduction in brake pipe pressure, said reservoirs being connected the one to the other only after the first reduction in brake pipe pressure has been completed.

3. In a fluid pressure brake, the combination with a brake pipe, of a first reduction reservoir, a second reduction reservoir initially out of communication with the first reservoir, and means for first venting fluid under pressure to the first reservoir to effect a reduction in brake pipe pressure and then only after the first reduction ceases to the second reduction reservoir to effect a second reduction in brake pipe pressure.

4. In a fluid pressure brake, the combination with a brake pipe, of a first reduction reservoir, a second reduction reservoir, a valve device having a position in which the first reduction reservoir is connected to the second reduction reservoir, and valve means having one position for connecting one side of said valve device to the atmosphere and another position in which fluid under pressure is supplied directly to said valve device.

5. In a fluid pressure brake, the combination with a brake pipe, of a first reduction reservoir, a second reduction reservoir, an equalizing reservoir, a valve device having a position in which the first reduction reservoir is connected to the second reduction reservoir, and valve means having one position in which one side of said valve device is connected to the atmosphere and another position in which the first reduction reservoir is connected to the equalizing reservoir and one side of said valve device is directly connected to a source of fluid under pressure.

6. In a fluid pressure brake, the combination with a brake pipe, of a first reduction reservoir, a second reduction reservoir, an equalizing reservoir, a valve device having a position in which the first reduction reservoir is connected to the second reduction reservoir, valve means having one position in which one side of said valve device is connected to the atmosphere and another position in which the first reduction reservoir is connected to the equalizing reservoir and said side of said valve device is directly supplied with fluid under pressure, and a second valve device having one position for connecting the opposite side of said first valve device to the atmosphere and another position for supplying fluid under pressure to said opposite side only when said valve means is in the position for connecting the first reduction reservoir with the equalizing reservoir.

7. In a fluid pressure brake, the combination with a brake pipe, of a first reduction reservoir, a second reduction reservoir, an equalizing reservoir, an application valve device having an application position, in which the first reduction reservoir is connected to the equalizing reservoir and having a release position, a valve having a position for connecting the first reduction reservoir to the second reduction reservoir, a piston subject to the opposing pressures of a piston chamber and a valve chamber for operating said valve, said valve device being adapted in application position to directly connect said valve chamber with a source of fluid under pressure.

In testimony whereof I have hereunto set my hand.

THOMAS H. THOMAS.